United States Patent [19]

Scheer

[11] 3,772,679

[45] Nov. 13, 1973

[54] PRECESSING ANALOG TRACE DISPLAY

[75] Inventor: David W. Scheer, Littleton, Colo.

[73] Assignee: Honeywell Inc., Minneapolis, Minn.

[22] Filed: June 30, 1971

[21] Appl. No.: 158,621

Related U.S. Application Data

[62] Division of Ser. No. 46,223, June 15, 1970.

[52] U.S. Cl. .......... 340/347 AD
[51] Int. Cl. .......... H03k 13/02
[58] Field of Search .......... 324/121 R; 340/347 AD; 179/15.55 T

[56] References Cited

UNITED STATES PATENTS

| | | | |
|---|---|---|---|
| 3,543,269 | 11/1970 | Dudley | 340/347 AD |
| 3,278,907 | 10/1966 | Barry | 179/15.55 T |
| 3,104,284 | 9/1963 | French | 179/15.55 TC |
| 3,621,150 | 11/1971 | Pappas | 179/15.55 T |

*Primary Examiner*—Daryl W. Cook
*Assistant Examiner*—Jeremiah Glassman
*Attorney*—Lockwood D. Burton and Arthur H. Swanson

[57] ABSTRACT

A signal display circuit includes an analog to digital converter, a recirculating memory, a digital to analog converter, and a CRT display means. The memory and the display means are synchronized so that a bright spot representative of the information contained in one location of the memory is produced on the display means for each shifting of information in the memory. New information replaces existing information in the memory at a rate less than the shifting rate of the memory so that the displayed signal appears to move across the viewing screen at a variable speed and with a constant brightness. When no new information is fed into the memory, the display means will continue to show the position of the signal as represented by the data stored in the memory.

3 Claims, 5 Drawing Figures

PRECESSING ANALOG TRACE DISPLAY

This application is a divisional application of a copending application by David W. Scheer, Ser. No. 46,233, filed on June 15, 1970.

The invention relates generally to the display of a signal and more specifically to the shifting of information laterally on the screen of a CRT while new information is being entered at one of the edges of the screen, or the "freezing" of repetitive or nonrepetitive signals on the screen for an indefinite period of time.

In many cathode ray tube oscilloscopes, the cathode ray or electron beam is deflected in accordance with the information signal to be displayed. Periodic signals can be observed as standing images on the screen. Nonperiodic signals however can only be observed for as long a time as the persistance of the phosphor allows. After the energy of the electron beam is absorbed by the phosphor, and released in the form of light, the information contained in this energy is lost and is not normally recoverable, per se. In many fields of endeavor, it is desirable to employ a signal display system of the CRT type and yet include a means to continuously display nonrepetitive signals and retain the information contained therein. An inroad to this end has been established by John A. Baring in his copending application Ser. No. 25,882, filed Apr. 6, 1970 which has also been assigned to the present asignee. Baring proposes a new type of a CRT in order to solve this problem. That solution, however, includes the provision of a unique CRT which is not presently readily available. It is therefore desirable to provide a signal display system with a means to display nonrepetitive signals while using presently available components.

It is an object of this invention to provide an improved signal display system with means to display nonrepetitive signals and retain the information represented thereby.

It is another object of this invention to provide the signal display system as set forth using presently available component parts to accomplish this retenative feature.

It is still another object of this invention to provide an impeoved display system as set forth which is relatively inexpensive.

It is a further object of this invention to provide a signal display system which is digital in nature, thereby obtaining greater flexibility and maximizing the compatability of the display system with computer systems.

In accomplishing these and other objects, there has been provided, in accordance with the present invention, a signal display system which incorporates a unique conjunctive combination of a CRT display means, an analog to digital conversion means, a digital to analog conversion means, and a signal control means. In an examplary operation, an analog input signal is sampled, converted to digital form and entered into a recirculating memory. The digital information is recirculated in the memory at a much higher rate than that which the samples are entered into the memory. Blocks of information are read out of the memory at the memory recirculating frequency. These read-out blocks of information are converted back to the analog form and are then presented to a comparing means. A CRT circuit includes a high speed sweep signal means and a low speed sweep signal means. A Z-axis modulation means is activated when the comparing means senses a substantial equality between the analog signal to be displayed and a reference signal related to the high speed sweep signal. By changing the relative synchronization of the sample input signal with the scope trigger signal, the display can be made to show a precessing image of the system input signal, or a stationary image of a time segment of the system input signal.

A better understanding of the present invention may be had by reading the following detailed description together with the associated drawings, in which.

Figures 1, 2:
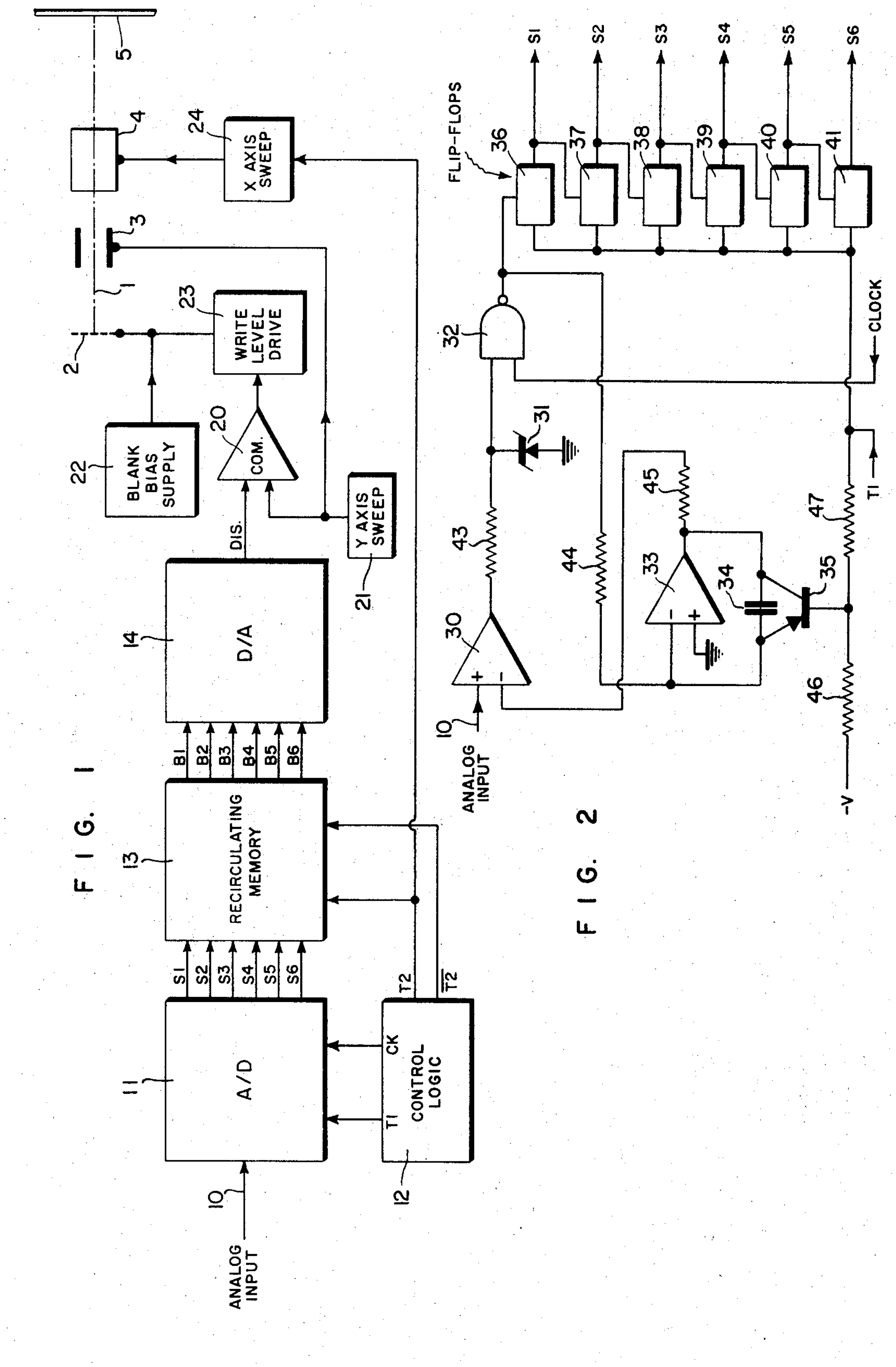
FIG. 1 is a schematic block diagram of the system according to the present invention.
FIG. 2 is a schematic logic diagram of the analog to digital converter shown schematically in FIG. 1.

In FIG. 1, the electron beam 1 is understood to be produced in the normal manner which is well known in the art, and therefore its associated circuitry is omitted to avoid uncessary complication. FIG.1 shows an electron beam 1, a Z-axis modulation or beam intensity control grid 2, vertical deflection plates 3, horizontal deflection plates 4, and a display screen 5. An analog signal to be displayed is applied to an input terminal 10 of an analog to digital converter 11. The analog to digital converter 11 has six output leads which are directly connected to the recirculating memory means 13. The recirculating memory means 13, in turn, has six output terminals which are directly connected to six input terminals of a digital to analog converter 14. A control logic circuit 12 supplies two input control signals to the analog to digital converter 11 and also supplies two input control signals to the recirculating memory 13. The digital to analog converter 14 has one output terminal which is connected to one input of a two-input Compare gate 20. A Y axis sweep generator 21 supplies the other input to the Compare gate 20, and also supplies a deflection signal to the vertical deflection plates 3 of a CRT. The single output lead of the comparator 20 is connected to the input of a write-level drive circuit 23. The write-level drive circuit 23 in conjunction with a Blank bias supply circuit 22 supplies the Z-axis modulation signal to the beam intensity control grid 2. The control logic circuit 12 also supplies a scope trigger signal T2 to an X-axis sweep generator 24 which is connected to the horizontal deflection plates 4.

FIG. 2 shows the analog input signal applied to one input terminal 10 of a comparator 30. The other input terminal of the comparator 30 is connected through a resistor 45 to the output circuit of a differential amplifier 33. The output terminal of the comparator 30 is connected through a resistor 43 to a common point connecting the cathode terminal of a Zener diode 31 and also one input terminal of a two input NAND gate 32. The anode terminal of the Zener diode 31 is connected to the control logic circuitry 12 as shown in FIG. 1. The output terminal of the NAND gate 32 is connected to one input terminal of a flip-flop circuit 36 and also through a resistor 44 to a common point connecting one input terminal of the amplifier 33, the emitter terminal of a transistor 35, and one terminal of a capacitor 34. The other terminal of the capacitor 34 is connected to a common point connecting the output terminal of the amplifier 33 and the collector terminal of the transistor 35. The second input terminal of the amplifier 33 is connected to ground. The base terminal of the transistor 35 is connected through a resistor 36 to a reference voltage V. The base of the transistor 35 is also connected through a resistor 47 to a common point connecting a terminal of the control logic circuitry 12 shown in FIG. 1 and one input terminal of each of six flip-flop circuits 36–41. The output terminals of the flip-flop circuits 36–41 are connected to input terminals of the recirculating memory 13 as shown in FIG. 1. The output terminals of the first five flip-flop circuits 36–40 are also connected to an input terminal of the next succeeding flip-flop circuit 37–41, respectively.

Figure 3:
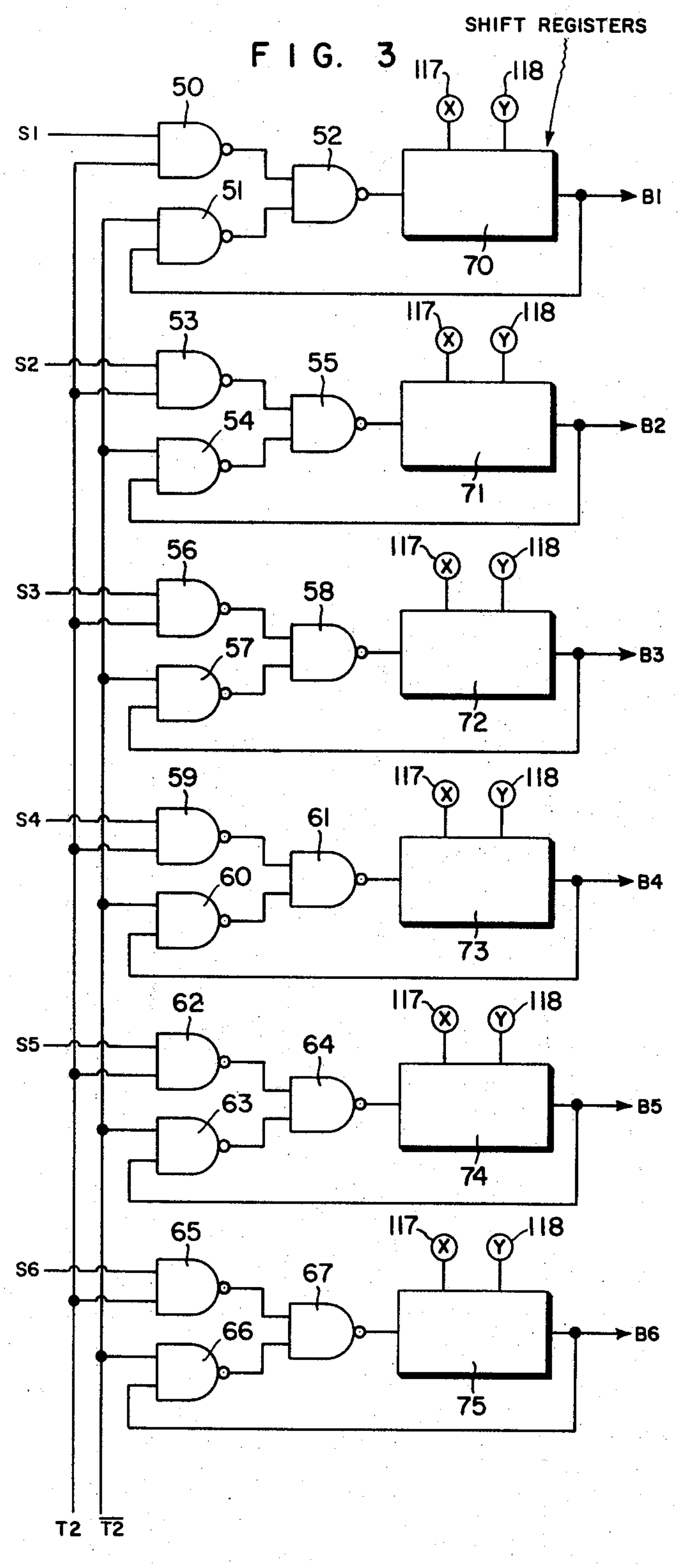
FIG. 3 is a schematic logic diagram of the recirculating memory shown in FIG. 1.

In FIG. 3, the recirculating memory 13 of FIG. 1 is shown in more detail. The recirculating memory 13 receives six input signals S1–S6 and two input timing signals T2 and $\overline{T2}$, and passes six output signals B1–B6 to the digital to analog converter 14. An examplary recirculating memory is shown comprising six stages. Each stage is made up of three NAND gates and one 512 bit shift register. A two input NAND gate 50 receives the first output signal S1 of the analog to digital converter 11, and a timing signal T2, at its input terminals. A two input NAND gate 51 receives a timing signal $\overline{T2}$ and the first stage output feedback signal B1 at its input terminals. The output terminals of these NAND gates 50 and 51 are connected to the input terminals of a two input NAND gate 52. The output terminal of gate 52 is connected to the input terminal of a shift register 70. The output terminal of the shift register 70 carries the output signal B1 of the first stage to the digital to analog converter 14. The second stage of the recirculating memory receives the second output signal of the analog to digital converter S2, timing signals T2 and $\overline{T2}$, and a fed-back shift register output signal B2, as its input signals. The second through the sixth stages are connected as the first stage with similar components and similar configurations respectively. Each shift register 70–75 also includes two input terminals 117 and 118 which carry two phases X and Y of a shift register clock signal.

Figure 4:
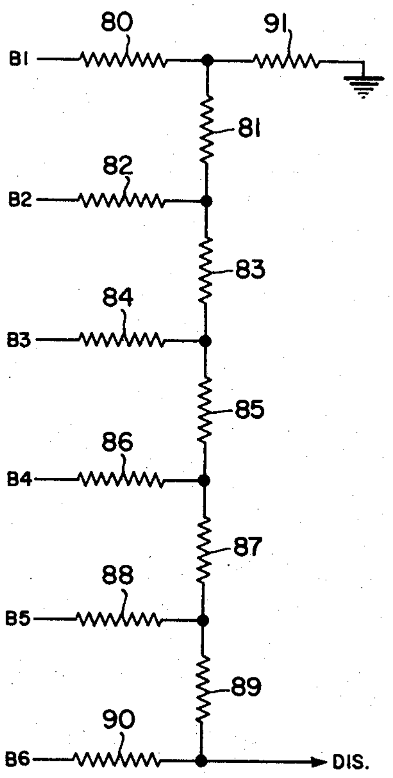
FIG. 4 is a schematic diagram of the digital to analog converter shown in FIG. 1.

FIG. 4, shows a typical circuit which may be used as the digital to analog converter 14 of FIG. 1. Six input signals B1–B6 are received from the memory circuit 13 and a single output signal DIS is passed on to a comparator circuit 20. Input signal B1 is connected to ground through two resistors 80 and 91. Input signal B6 is connected to the output terminal DIS through a resistor 90. Five resistors 81, 83, 85, 87 and 89 are connected in series between the common point connecting two resistors 80 and 91, and the point connecting another resistor 90 and the output terminal DIS of the digital to analog converter 14. Input signal B2 is connected through a resistor 82 to a point connecting the first two serial resistors 81 and 83. A point connecting the second serial resistor 83 and the third serial resistor 85, receives a third input signal B3 through a resistor 84. Input signal B4 is received through a resistor 86 by a point connecting the third serial resistor 85 and the fourth serial resistor 87, and input signal B5 is connected through a resistor 88 to a point connecting the fourth serial resistor 87 and the fifth serial resistor 89.

Figure 5:
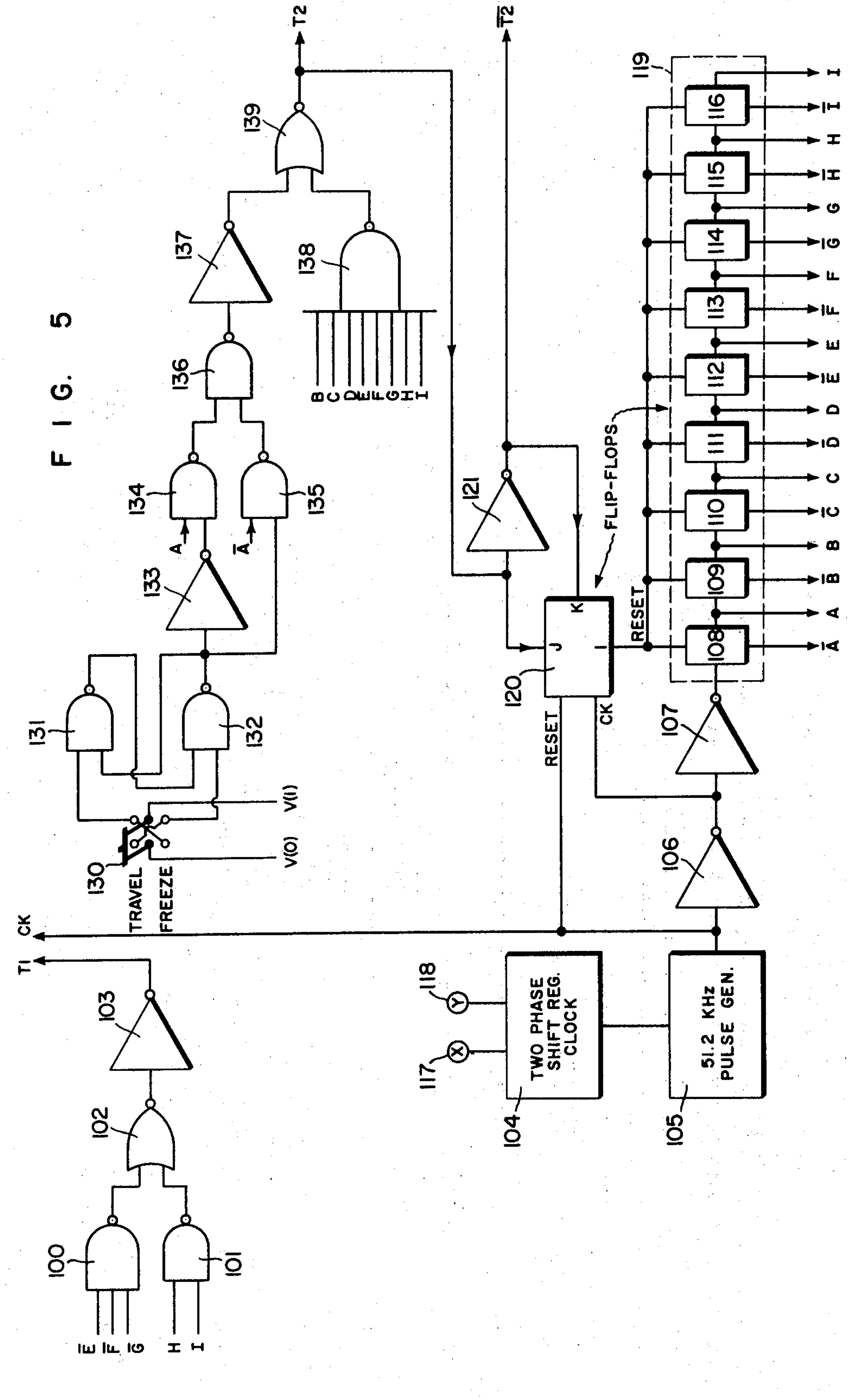
FIG. 5 is a schematic logic diagram of the control logic circuit shown in FIG. 1.

The control logic circuit 12 represented in FIG. 1, is shown in more detail in FIG. 5. In the present examplary embodiment, there is a 51.2 KHZ pulse generator 105. This is connected to a two-phase shift register clock 104. The output terminals of the two phase shift register clock 104 are connected to input terminals 117 and 118 of each of the six shift registers 70 to 75. Another output terminal CK of the pulse generator 105 is connected to the analog to digital converter 11 of FIG. 1. The same output terminal is also connected through two inverters 106 and 107 to a nine stage counter 119 comprised of nine flip-flop circuits 108 through 116. The output signals from these flip-flop circuits 108 through 116 are designated as A through I when negated outputs $\overline{A}$ through $\overline{I}$ also available. NAND gate 100 receives $\overline{E}$, $\overline{F}$, and $\overline{G}$ as input signals and NAND gate 101 receives input signals of H and I. The outputs of these NAND gates 100 and 101 act as inputs to a NOR gate 102. The output of NOR gate 102 is connected to the input of an inverter 103, the output of which is designated as timing signal T1 and is applied to the analog to digital converter 11 as shown in FIG. 1. Two NAND gates 131 and 132 are connected in a typical latch type circuit. A logic zero voltage level V(O) is applied to either one input of the two input NAND gate 131 or one input of the other two input NAND gate 132,depending upon the poisiton of switch 130. The connection to the gate 131 is designated as the "FREEZE" position and the connection from logic zero to the input of the second gate 132 is designated as the "TRAVEL" position of the switch 130. The other input to NAND gate 131 is connected to the output of NAND gate 132 and the other input of NAND gate 132 is connected to the output of the NAND gate 131. The output terminal of gate 132 is also connected to a common point connecting the input terminal of an inverter 133 and one input terminal of a two input NAND gate 135. The output terminal of the inverter 133 is connected to one input of a NAND gate 134. The signal A from the flip-flop 108 acts as the other input to NAND gate 134 while the signal $\overline{A}$, also from flip-flop 108, acts as the other input signal to NAND gate 135. The output terminals of these two gates 134 and 135 are connected to the input terminals of a two input NAND gate 136. The output terminal of gate 136 is connected, through an inverter circuit 137 to one input of a two input NOR gate 139. The other input of the NOR gate 139 is connected to the output of an eight input NAND gate 138. The input signals to the gate 138 are the signals B,C,D,E,F,G, H and I from the flip-flops 108 through 116, respectively, of the counter. The output of the NOR gate 139 is designated as timing signal T2 and is applied to the memory circuit 13 as shown in FIG. 1. The output terminal of the pulse generator 105 is also connected to the reset terminal of a flip-flop 120. The clock input terminal of the flip-flop 120 receives a clocking signal from the output terminal of the inverter gate 106. One input terminal of this flip-flop 120 is connected to the input of an inverter 121 and also to the output terminal of NOR gate 139. The other input terminal of the flip-flop 120 is connected to the output of inverter 121 and this point which carries timing signal $\overline{T2}$,is connected to the recirculating memory circuit 13 of FIG. 1.

In operation the system clock pulse generator 105 (FIG. 5) generates a square wave at a frequency of 51.2 KHZ in the examplary embodiment. The two phase shift register clock 104 supplies the shift registers 70 to 75 (FIG. 3) with two phases of clocking signals using the signal from the pulse generator 105 as a base. The shift register clocking signals cause the information in the shift register to shift to the next position while each system clock pulse is at a high logic level. As shown in FIG. 5, the clock signal from the pulse generator 105 passes through two inverter circuits 106 and 107 and is fed into a counting means comprised of nine flip-flops 108–116. The output signals of these flip-flops are designed as A–I, respectively. This counter operates in a well known manner, counting in an ordinary binary mode to a maximum count capacity of 512. The timing signal T1 is generated by means of two NAND gates 100 and 101, a NOR gate 102 and an inverter 103. These gates are arranged so that the signal T1 goes low after the 384th clock pulse and remains low until the 400th clock pulse goes low, at which time T1 will return to the high logic level. This sixteen count pules T1 occurs once per counter cycle. One counter cycle in the examplary embodiment of the present invention elapses for every 512 clock pulse if the display system is in the "FREEZE" mode of operation, or every 511 clock pulses if the display system is in the "TRAVEL" mode of operation.

The circuit including the amplifier 33, the comparator 34 and the transistor 35, comprises a staircase signal generating circuit. When the timing signal T1 goes low, the transistor 35 is rendered conductive, discharging the capacitor 34 therethrough. T1 going low also resets the six flip-flops 36-41 of the analog to digital converter circuit. During the sixteen counts that T1 is low, the capacitor 34 will not accumulate any charge and the six flip-flops in the analog to digital converter will not accumulate any count. When T1 goes high again after a count of 400, the flip-flops 36–41 in the counter are enabled and the transistor 35 is disabled. The disabled transistor 35 allows the capacitor 34 to again accumulate charge. The charge on the capacitor 34 reaches its full scale value in 64 counts and therefore a complete sampled word will appear at the output of the analog to digital converter no later than the count 464 of each 511 or 512 count cycle. The output of the comparator 30 is normally at a high logic level and therefore clock pulses are gated through NAND gate 32 and begin to accumulate in the six flip-flop circuits 36–41. These gated clock pulses are also received and accumulated in the form of a staircase voltage waveform by the coordinated action of the amplifier 33 and the capacitor 34. This circuit provides a staircase waveform at one input of comparator circuit 30. When the staircase voltage is substantially equal in value to the value of the analog input signal, the output signal of the comparator circuit 30 goes low. When the output of the comparator circuit 30 goes low, the NAND gate 32 is disabled and clock pulses are no longer passed. From this instant in time until the next going low timing signal T1 is received, the sampled analog input remains in the flip-flops 36-41 in digital form. The staircase circuit reaches full scale in 64 counts and therefore a complete sampled word will appear at the output of the analog to digital converter no later than count 464 of each cycle. In the examplary embodiment, since the clock pulse frequency is 51.2 KHZ and T1 goes low only once per every 512 clock pulses, the analog input signal is sampled at a rate of 100 samples per second.

Timing signal T2 and timing signal $\overline{T2}$ orginate in the control logic circuits shown in FIG. 5. NAND gate 138 has input signals of B to I inclusive. This gate will yield a low level pulse when all of its input signals are at a high logic level. Therefore gate 138 will yield a low level pulse to NOR gate 139 whenever a count of 510 is sensed. Gate 139 further conditions this signal so that timing signal T2 will occur either on count 511 or on count 512. This is determined by the position of the mode switch 130. Whenever the switch 130 is in the "TRAVEL" position a low level pulse is generated at the output of inverter 137 which is in phase with the first base signal A. The base signal A goes to a high logic level on the trailing edge of the odd-numbered clock pulses and returns to the low level on the trailing edge of the even-numbered clock pulses. Therefore after a count of 510 has been sensed, a low level signal appears at one input of gate 139 from gate 138, if switch 130 is in the "TRAVEL" position, a low level pulse will appear at the other input of gate 139 after the trailing edge of clock pulse 510 but will go high again at the trailing edge of clockpulse 511. The combination of these two low level pulses at the inputs of gate 139 will yield a high level pulse at the output of NOR gate 139. This output signal is designated as T2. T2 will normally be low, but will go high on the trailing edge of clock pulse 510 and return to the low logic level on the trailing edge of clock pulse 511 when the switch 130 is in the "TRAVEL" position. If the switch 130 is in the "FREEZE" position, there will be a low level signal at the output of inverter 137 whenever signal A goes high. Therefore after a count of 510 is detected by gate 138, a low level signal is established at the output gate 138. If the switch 130 is in the "FREEZE" position, the output signal from gate 137 will go low whenever A goes high. When the output of gate 137 and the output of gate 138 are both low, the output of gate 139, T2, will be high. In the "FREEZE" mode of operation, this occurs at the trailing edge of clock pulse 511 and T2 will go back to the low logic level with the trailing edge of clock pulse 512. Timing signal T2 will therefore be a positive going pulse which occurs once per cycle at the trailing edge of clockpulse 510 or at the trailing edge of clockpulse 511 depending upon the position of the mode switch 130. Timing signal T2 is applied as an input signal to the inverter 121, the output of which is designated as timing signal $\overline{T2}$. The flip-flop circuit 120 acts to reset the flip-flops 108-116 which comprise the counter for the base signals A to I. This flip-flop 120 synchronizes the mode operation, determined by the mode switch 130, with the clock signal counter. When the mode switch 130 is in the "TRAVEL" position the counter will count to 511 and reset, and when the mode switch 130 is in the "FREEZE" position the counter resets after counting 512 pulses.

The recirculating memory 13 (FIG. 1) is shown in greater detail in FIG. 3. Each of the six stages of the recirculating memory 13 can be considered as having a gating section and a memory section. For example, the first stage receiving the digital signal S1 is made up of a gating section comprised of three NAND GATES 50, 51, and 52 and a memory section comprised of a shift register 70. Functionally, the gating section can be viewed as two AND gates feeding an OR gate. While the timing signal T2 is high, the sample bit S1 will be passed through a sample gate 50 and an enter gate 52 to be received by the shift register 70. While the timing signal $\overline{T2}$ is high the shift register output signal B1 will be passed through the feedback gate 51 and through the enter gate 52 to be received by position 1 of the shift register 70. It should be noted here that the shift register 70 is shifting at a rate substantially equal to the clock frequency which is 51.2 KHZ in this example. The sampled values S1–S6 are presented to the recirculating memory at a substantially lower frequency. The rate of presentation of sampled values is either one in every 511 clock pulses, or one in every 512 clock pulses depending on whether the mode switch 130 is in the "TRAVEL" position or in the "FREEZE" position. Timing signal $\overline{T2}$ is normally at the high logic level. While timing signal $\overline{T2}$ is at the high logic level, the feedback gates are enabled and feedback signals are allowed to pass from position 512 of the shift register to position 1 of the shift register.

A digital sample will appear at the output terminals of the analog to digital converter between the counts of 400 and 464 during each 512 or 511 count cycle. In the shift register, information is shifted from one position to the next during each clock pulse. In an examplary operation, digital samples A, B, and C, are entered into the shift registers 70–75. A, B, and C, represent digital words. Digital word A is comprised of digital bits A1–A6. Digital bits A1, B1 and C1, will be entered into shift register 70. Digital bits A6, B6 and C6 will be entered into shift register 75. At the begining of a new cycle, the counter 119 begins to count and after counting to 464 a sampled word A as represented by sampled bits A1–A6 appears at the input terminals of the recirculating memory 13. In the "TRAVEL" mode, after a count of 510 has been sensed, timing signal T2 goes high. When T2 goes high sampled bits A1–A6 pass the respective sample gates of each stage and are presented to the corresponding or associated shift registers 70–75 respectively. While T2 is high and during the next clock pulse 511, a shift signal is received by the shift registers and digital bits A1–A6 are entered into position 1 of each shift register 70–75, respectively. T2 then goes low causing the electron beam to begin a new sweep of the display screen. When T2 goes low, the reset flip-flop 120 changes states and causes the counter to reset and begin to count clock pulses again from O. After 510 more clock pulses have been counted, sampled bits A1–A6 are in the 511th position of their respective shift registers. At this time, timing signal T2 goes high. T2 going high allows the next sampled word B as represented by sampled bits B1–B6 to pass their respective sample gates and be presented to the input terminals of the shift registers 70–75. While T2 is high and during the next clock pulse which is the 511th clock pulse, the shift registers receive a shift signal and the newly sampled bits B1–B6 are entered into position 1 of the respective shift registers while the first sampled bits A1–A6 are passed from position 511 to position 512 of the shift register 70–75. T2 then goes low thereby causing the electron beam to begin a new sweep. The counter is again reset and begins to count from zero. The first bright spot produced on the display screen by the electron beam will be representative of the analog equivalent of the digital word A made up of digital bits A1–A6. After 510 more clock pulses have been counted, timing signal T2 again goes high thereby enabling the sampled gates to enter the newly sampled word C as represented by sample bits C1–C6. While T2 is high and during the next clock pulse 511, a shift signal is received and the sampled bits C1–C6 are allowed to enter into position one of their respective shift registers 70–75. At the same time, previously sampled bits B1–B6 are entered into position 512 and bits A1–A6 are entered into position 511 of their respective shift registers 70–75. T2 now goes low, which causes the electron beam to begin a new scan of the display screen. Since sampled bits B1 through B6 are now present in position 512 of their respective shift registers 70–75, their analog equivalent value will be represented by the first bright spot produced on the display. Upon the next shift signal sample bits C1–C6 are transferred to position 2 of their respective shift registers 70–75. At this time sample bits B1–B6 are shifted into position 1 and sampled bits A1–A6 are shifted into position 512 of the shift registers 70–75. Since samples A1–A6 are now in position 512, their equivalent analog value will be next presented on the display screen adjacent to the analog equivalent of sampled bits B1–B6. In the "TRAVEL" mode, this process is repeated for every 511 clock pulses. Thus it is seen that in the travel mode, newly sampled information is always entered at one edge of the viewing screen while existing memory information is made to shift laterally thereby creating the effect of a pen recorder on the face of a CRT.

If an analog signal is being displayed in the above manner on the display screen, and the mode switch is changed to the "FREEZE" mode, the displayed signals will remain stationary thereby providing the effect of stopping the analogical pen chart recorder. If for example, sampled bits A1–A6 are in position 510 of their respective shift registers 70–75 when the "FREEZE" mode is initiated, the next shift pulse will shift sampled bits A1–A6 into position 511. Since the mode switch 130 is now in the "FREEZE" position, timing signal T2 will rise with the falling edge of pulse 511 and will go low again with the falling edge of clock pulse 512. When T2 goes high the sample-enter gates are enabled and upon the next shift pulse, a new sample, for example B1–B6 will be entered into position 1 of the respective shift registers and the information contained in position 511, A1–A6, will be shifted into position 512. Next the T2 signal will go to the low logic level. At this time, the X axis sweep signal is initiated and electron beam begins a new sweep across the display screen. The first bright spot produced by the electron beam will be representative of the analog equivalent value of the digital word contained in position 512 of the shift registers 70–75, which, in this example, is the digital word A comprised of bits A1–A6. In the "FREEZE" mode, timing signal T2 will not rise again until 511 more clock pulses have been counted. At that time the digital word A will have shifted 511 times and will be in position 511 again. During the time T2 is high, digital word A is shifted into position 512, and when T2 goes low the electron beam is caused to begin a new sweep across the display screen and the first bright spot produced is representative of the analog equivalent of the digital word A again. Therefore, in all succeeding cycles in the "FREEZE" mode of operation, the display of the digital information contained in the shift registers will be synchronized with the shift register cycles so that at the begining of each electron beam sweep of the display scree, the same digital word is present in position 512 and a stationary image representative of the information contained in the recirculating memory will be displayed on the viewing screen.

The digital output signals of the recirculating memory 13 are received by the digital to analog converter 14, shown elementarily in FIG. 4. In the examplary embodiment of the present invention, a logic 1 signal is substantially equivalent to a potential of 5 volts and a logic 0 is substantially equivalent to a potential of 0 volts. The shift registers 70–75 provide low impedance sources for the digital to analog converter input signals and therefore these low impedance sources can be treated practically as 0 impedance paths to ground. The resistances of the resistors 80,82,84,86,88 and 90 which are serially connected to the digital to analog converter input termnals B1–B6,respectively, and also the ground connection resistor 91 all have a value of twice that of the inter-input connecting resistors 81,83,85,87 and 89. In other words, if the value of the inter-input connecting resistors is taken to be R, the value of the resistors in series with the input terminals is 2R. This configuration yields a peculiar characteristic in that the impedance from any nodal point to ground is always R. The output signal DIS (the signal to be displayed) is taken from the junction between the final two resistors 89 and 90 of the network. The signal representing the least significant bit in any digital word being fed in is shown as B1, and, conversely, the signal representing the most significant bit in any digital word being fed into the digital to analog converting circuit 14 at any one time is represented in FIG. 4 by B6. This circuit is well known in the art and no lengthy description of its operation is believed to be necessary. Suffice it to say that any logic 1 input signal in the exemplary embodiment can be treated as a 5 volt voltage source connected from ground to the respective input terminals B1 through B6. A logic 0 input at any input terminal acts to connect the input terminals B1–B6 to ground. By use of Thevenin's equivalent circuits and Norton's equivalent circuits, the network can be reduced down to one Thevenin's equivalent circuit from which the output signal can be ascertained. For example if a logic 1 appears at the least significant bit terminal and the other input terminals are all carrying a logic 0 level, the output voltage at terminal DIS is equal to 5 volts divided by $2^6$ or 5/64 of a volt. If a logic level of 1 is present at the most significant bit B6 and all the other input signals are at a logic 0 level the output voltage at terminal DIS is equal to 5 volts divided by $2^1$ or 5/2 of a volt. Also if the two most significant input bit terminals are carrying a logic 1 level and the others are carrying a logic 0 level the output voltage will be 5 volts divided by $2^1$ plus 5 volts divided by $2^2$ or 5/2 of a volt plus 5/4 of a volt. Thus an analog output voltage from the digital to analog converter 14 is provided at all times and is representative of the digital input signals B1–B6 which in turn reflect the binary information contained in position 512 of each shift register in the recirculating memory 13.

A new word is passed from the recirculating memory 13 (FIG. 1) to the digital to analog converter 14 in the present example at a rate of 51.2 KHZ. Therefore a different analog value DIS will be put out of the digital to analog converter 14 at the same rate the Y axis sweep frequency which is the high speed axis in the examplary embodiment of the present invention, is substantially equal to the frequency of the control logic clock or 51.2 KHZ. Therefore, by means of the comparator 20 and a write-level drive circuit 23 the electron beam 1 of a CRT is intensified at one spot during each Y axis sweep of the screen. The position of this spot is controlled by the comparator 20 so that when the analog output signal DIS and the value of the Y axis sweep voltage are substantially equal, a signal will be passed to the write-level drive circuit 23 which will cause a pulse to be passed to the beam intensification grid 2 thereby producing a bright spot on the display screen 5. At all other times, when the two input signals to the comparator 20 are not substantially equal, the Blank Bias Supply circuit 22 provides a voltage level to the beam intensification grid 2 which is insufficient to excite the target screen 5 to luminoscity. The X axis sweep circuit 24 is triggered by timing signal T2 to return to a reference position and begin its low speed scan of the display screen 5. Timing signal T2, as explained hereinbefore, is controlled so that in the "TRAVEL" mode of operation the spot representative of the newly sampled word from the analog to digital converter 11 always appears at one edge of the display screen 5 while previously existing bright spots are shifted laterally toward the opposite side of the screen from which the new sample is entered. Each shift distance is substantially equivalent to the horizontal distance moved by the electron beam 1 during one vertical sweep of the screen 5.

Thus there has been provided a signal display system with the capability of propagating existing traces to one side of the viewing screen while introducing bright spots representative of presently occurring signal values at the other side of the screen, or stopping the moving display on command and refreshing the "FROZEN" display with every sweep of the electron beam thereafter using a unique combination of readily available component parts and at a minimal cost.

The embodiments of the invention in which an exclusive property or privilege is claimed are defined as follows:

1. A combination comprising an analog signal input terminal, analog to digital converter means having an input circuit connected to said input terminal, and an output circuit, a selectively variable digital delay means having an input circuit and an output circuit, first circuit means connected between the output circuit of said analog to digital converter means and the input circuit of said delay means, a digital to analog converter means having an input circuit and an output circuit, second circuit means connected between the output circuit of said delay means and the input circuit of said digital to analog converter means, and a control means including a selectively operable switching means, said control means being connected to said delay means for selectively determining in accordance with a selected condition of said switching means, a digital signal delay characteristic of said delay means.

2. A combination as set forth in claim 1 wherein said analog to digital converter means includes means for producing a plurality of digital signals on corresponding output lines from the output circuit of said analog to digital converter means representative of a digital word and said variable digital delay means includes a separate variable delay means for each of the digital signals to concurrently delay said digital signals in parallel.

3. A combination as set forth in claim 1 wherein said delay means includes recirculating storage means for the digital signals applied thereto from said analog to digital converter means whereby each recirculation of a digital signal is an incremental delay portion of the signal delay characteristic of said delay means.

* * * * *